Inventors
Oscar A. Wandel
and Richard H. Doyle
Attorneys.

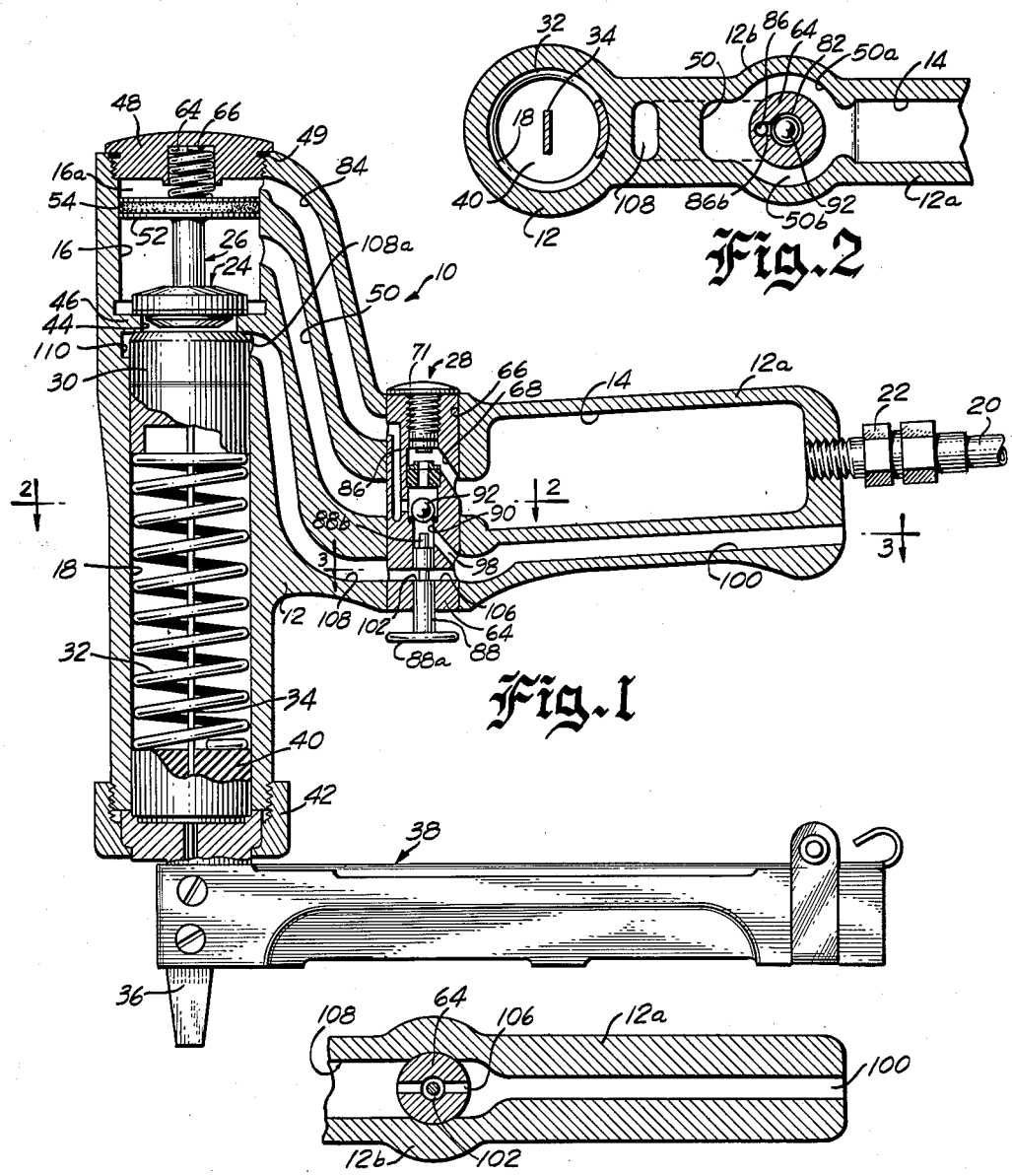

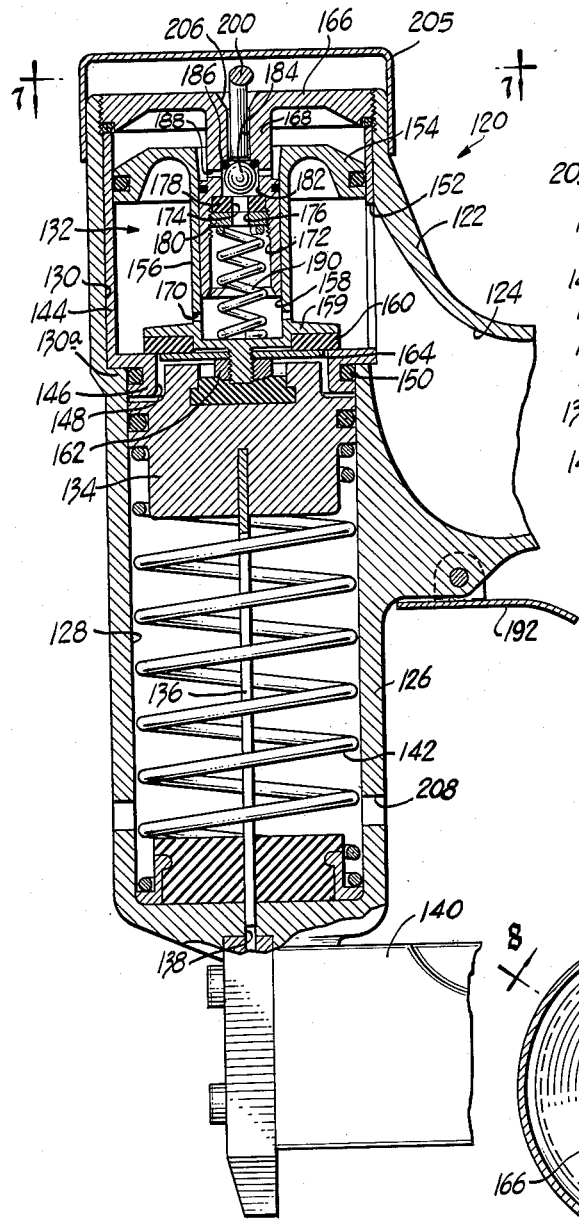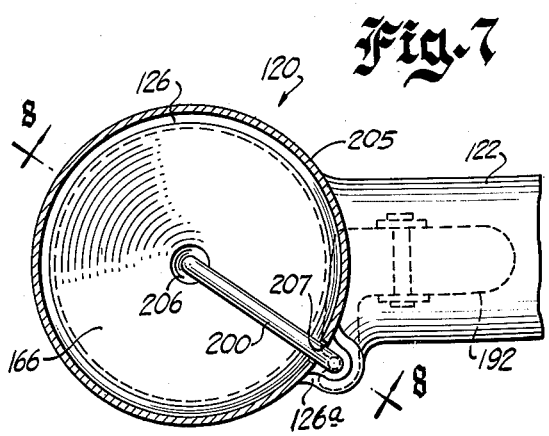
Inventors
Oscar A. Wandel
and Richard H. Doyle
by Mason, Kolehmainen, Rathburn and Wyss
Attorneys.

United States Patent Office 3,094,901
Patented June 25, 1963

3,094,901
PNEUMATICALLY OPERATED TACKER
Oscar A. Wandel, Mundelein, and Richard H. Doyle, Mount Prospect, Ill., assignors to Fastener Corporation, Chicago, Ill., a corporation of Illinois
Filed May 2, 1958, Ser. No. 734,381
29 Claims. (Cl. 91—454)

This invention relates to apparatus for driving fasteners, and, more particularly, to a pneumatically operated stapler or tacker. The present application is a continuation-in-part of the copending application of Oscar A. Wandel and Richard H. Doyle, Serial No. 546,377, filed November 14, 1955, now abandoned, which copending application is assigned to the same assignee as this application.

The ease and increased speed of utilizing pneumatically operated bench or hand tools for driving staples, nails or similar fasteners has resulted in the use of these devices beyond the fields of application to which manually operated, spring driven devices had been confined. However, in some of these additional fields of expansion, it is necessary to secure relatively deep penetration into hard substances such as solid oak beams and panels. In some instances, this greater penetration can be accomplished by the use of higher pressure compressed air, but this proposal is not desirable in many applications due to the need for high pressure lines and compression equipment and to the increased cost of hand tools which can be safely operated at these increased pressures.

Other attempts have been made to secure greater penetration of the fasteners in hard substances by subjecting the fastener to repeated blows by the driving means so that the fastener is advanced much in the manner that a nail is manually driven by repeated blows of a hammer. However, small diameter fasteners, such as staples, often bend under repeated impacts of this type. A further proposal, in pneumatically actuated devices, involves the provision of latching mechanisms which retain the driving element until a predetermined operating pressure is obtained in the driving cylinder, thereby to obviate the actuation of the fastener driving means until the full pressure of the line is available to operate the driving means and, accordingly, to obviate the shallower penetration of the fastener due to the reductions in the air pressure because of throttling and similar effects in the fluid conveying means and valve means connecting the air line with the driving cylinder. However, such devices are difficult to maintain and service because of the somewhat complicated nature of the pressure responsive latching means, in addition to having an increased initial cost.

Accordingly, one object is to provide a new and improved pneumatically operated fastening apparatus.

Another object is to provide a pneumatically operated fastening device including means for obtaining greater penetration of driven fasteners.

A still further object is to provide pneumatically operated fastening apparatus having easily and economically constructed means for securing the full driving power of an operating medium under pressure.

Another object involves the provision of a stapler including means for supplying a large volume of compressed air at full line pressure to the operating cylinder for a staple driving means.

Another object is to provide a stapler including a staple driver operating cylinder and means adjacent said cylinder providing a large body of compressed air for advancing the staple driver.

Another object is to provide a pneumatically operated fastening apparatus having a driving cylinder supplied with compressed air through conveying and valve means which do not substantially reduce the pressure of the compressed air.

In accordance with these and many other objects, one embodiment of the present invention comprises a stapler hand tool housing having structure forming spaced control and operating chambers. A handle portion of the housing provides a reservoir which is supplied with air under pressure from an external source and which is in continuous fluid communication with the control chamber. The operating chamber slidably receives a driver blade actuating piston and is in communication with the control chamber through an enlarged opening having substantially the same diameter as the aligned chambers. This opening is normally closed by a valve element carried by a control piston which is slidably disposed within the control chamber so that the compressed air continuously supplied to the control chamber from the reservoir does not flow into the operating chamber to actuate the blade driving piston.

The handle portion of the housing is provided with a manually actuated valve which normally supplies compressed air to the control chamber at both sides of the control piston to hold the valve element in a position interrupting fluid communication between the control chamber and the operating chamber. When the valve is actuated, the portion of the control chamber at the side of the control piston spaced from the opening is connected to atmosphere, thereby operating the control piston to move the valve element away from the opening to place the control chamber in communication with the operating chamber through this enlarged opening. Since the control chamber contains a large volume of compressed air and since it is in continuous communication with the compressed air reservoir, a large body of compressed air at full line pressure is instantaneously supplied to the operating chamber to drive the piston and blade so that the staple is driven at the full line pressure to secure greater penetration of the workpiece.

In another embodiment of the invention, there is provided a stapler housing having structure forming spaced control and operating chambers. A hollow handle portion of the housing provides a reservoir which is supplied with air under pressure from an external source and which is in continuous fluid communication with the control chamber. The operating chamber slidably receives a driver blade actuating piston and is in communication with the control chamber through an enlarged opening defined by a flanged sleeve which is removably mounted in the control chamber. The opening defined by the flanged sleeve is normally closed by a valve element carried on a control piston which is slidably disposed within the sleeve. The control piston is provided with an axially extending opening in which is slidably mounted a hollow guide member carried on a closure cap which closes the upper end of the control chamber.

A series of openings formed in the control piston permit the compressed air normally supplied to the control chamber to flow upwardly through the hollow guide member to the other side of the control piston. Thus, in the normal or released condition of the stapler, compressed air is supplied to both sides of the control piston to urge the valve into engagement with the flanged portion of the sleeve so as to close off communication between the control chamber and the operating chamber. When the stapler is actuated, one portion of a recessed operating rod is moved downwardly to close off an exhaust passageway extending through the housing to the upper end of the operating chamber. A second portion of the operating rod, which is connected to the first portion thereof by a lost motion connection, displaces a ball valve disposed in the hollow guide member to close off communication between the upper and lower portions of the control chamber and to open up an exhaust passageway for the upper portion of this chamber. The pressure differential produced across the control piston lifts the main valve element out of engagement with the flanged portion of the sleeve to place the upper end of the operating chamber in direct communication with the compressed air in the reservoir and the control chamber, thereby driving the piston downwardly to advance and set a staple supplied from a magazine.

When the operating rod is released, the first portion moves upwardly to open up the exhaust passageway for the upper end of the operating chamber and the second portion of the operating rod permits the ball valve to seal off the exhaust passageway for the upper portion of the control chamber and to place this portion of the control chamber in communication with the compressed air. The admission of compressed air to the upper portion of the control chamber again seats the valve element on the flanged portion of the sleeve so that communication between the control chamber and the upper end of the operating chamber is sealed off. A compression spring interposed between the lower end of the operating chamber and the piston returns the piston and driver blade to a normal position determined by its engagement with the flange on the sleeve.

The invention both as to its construction and method of operation together with further objects and advantages thereof are best understood by reference to the following detailed description when taken in conjunction with the accompanying drawings wherein:

FIG. 1 is a side elevational view, in partial section, of a pneumatically operated stapler embodying the present invention;

FIG. 2 is a cross sectional view taken along line 2—2 in FIG. 1, assuming that the complete stapler structure is shown therein;

FIG. 3 is a cross sectional view taken along line 3—3 in FIG. 1 again assuming that the complete stapler structure is disclosed therein;

FIG. 6 is a side elevational view in partial section of another pneumatically operated stapler embodying the present invention;

FIG. 7 is a top plan view taken along line 7—7 in FIG. 6 assuming that the entire stapler construction is shown therein; and FIG. 8 is a cross sectional view taken along line 8—8 in FIG. 7 again assuming that the entire stapler construction is illustrated therein.

Figure 4:
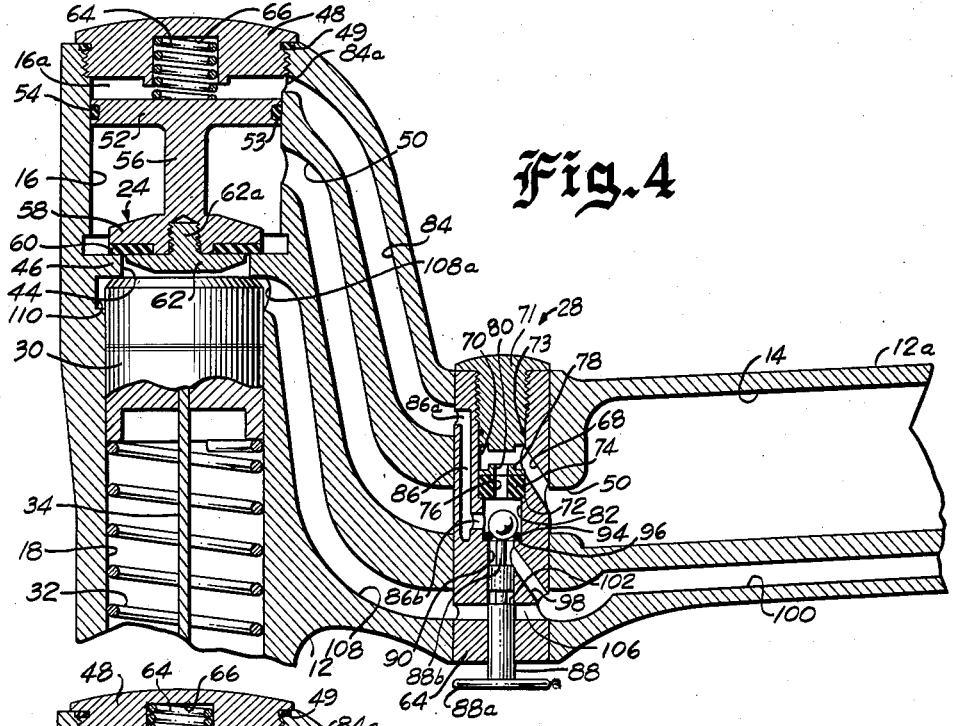
FIG. 4 is an enlarged fragmentary cross sectional view illustrating one position of a control valve forming a portion of the stapler shown in FIG. 1.

Referring now to FIG. 1 of the drawings, a stapler or tacker, indicated generally as 10, embodying the present invention is shown therein as including a main casting or housing 12 including structure defining an air reservoir 14 in a handle portion 12a, a control chamber or cylinder 16 forming an additional air reservoir, and a driving chamber or cylinder 18. The reservoir 14 is normally supplied with air under pressure from a line 20 which is connected to the handle portion 12a of the housing 12 by a threaded nipple 22. The compressed air within the reservoir 14 is continuously supplied to the control chamber 16 to provide a large body of compressed air at full line pressure disposed immediately adjacent the driving cylinder 18, fluid communication between the chambers 16 and 18 in a normal condition of the stapler 10 being interrupted by a valve element 24 forming a portion of a control piston arrangement indicated generally as 26.

When a control valve 28 mounted on the handle portion 12a is operated, the control piston arrangement 26 is moved to place the chambers 16 and 18 in fluid communication, thereby permitting the body of compressed air contained within the chamber 16 and that provided in the reservoir 14 to flow without substantial pressure reduction into the driving or operating chamber 18. This compressed air moves a driving piston 30 downwardly within the cylinder 18 against the action of a coil spring 32 so that a staple driving blade 34 passes through a drive track formed in a nosepiece 36 to drive staples supplied thereto by a staple magazine 38. Since this compressed air is admitted to the chamber 18 without substantial turbulence and is provided by the relatively large body of compressed air contained within the chamber 16 positioned immediately adjacent the driving cylinder 18, the piston 30 is driven at substantially the full pressure of the air supplied to the reservoir 14, and, since a large body of air is immediately admitted to the chamber 18 upon operation of the valve assembly 28, the stapler 10 is capable of driving the staples provided by the magazine 38 to secure much greater penetration than is possible with pneumatically operated staplers of a conventional design.

The staple driving mechanism embodied in the stapler 10 of the present invention may be of any suitable type well known in the art and, specifically, may be of the construction shown and described in the copending application of Oscar A. Wandel, Serial No. 527,697, filed August 11, 1955, which copending application is assigned to the same assignee as the present application. As shown therein, the driver blade 34 may be detachably secured to the driving piston 30 which is provided with buffing means to prevent embrittlement of the driver blade 34. A bumper construction 40 is positioned within the chamber 18 adjacent the lower end thereof to cushion the shock of impact when the piston 30 reaches the end of its working stroke. The staple magazine 38 may be of the type disclosed in the above identified copending application or may also be of the type disclosed in the copending application of Oscar A. Wandel, Serial No. 546,354, filed November 14, 1955, now Patent No. 2,931,038, which application is assigned to the same assignee as the present application. The nosepiece 36, which supports the magazine 38, is detachably secured to the lower end of the housing 12 by a collar 42 and serves both to close the end of the chamber 18 and to provide a support for the bumper construction 40. In operation, the piston 30 is moved downwardly by the compressed air supplied from the chamber 16 and the reservoir 14 so that the driver blade 34 passes through a drive track formed in the nosepiece 36, thereby to engage and drive an individual staple supplied by the magazine 38. When the compressed air is vented from the chamber 18, the piston 30 and the driver blade 34 are returned to their normal position by the compression spring 32.

Referring now more specifically to the construction of the stapler 10 of the present invention which affords means for providing increased fastener penetration and improved efficiency in the utilization of the compressed air supplied thereto, the control chamber or cylinder 16 is formed in the upper portion of the housing 12 and is in fluid communication with the driving chamber or cylinder 18 through an opening or bore 44 which is of substantially the same diameter as the cylinders 16 and 18 and which is defined by an inwardly extending flange or lip 46. The flange 46 also serves as a stop to limit return movement of the piston 30 by the spring 32. The upper end of the cylinder 16 is closed by a removable cap 48 which threadedly engages the housing 12 and which is provided with a sealing gasket 49. To provide an additional compressed air reservoir immediately adjacent the driving cylinder 18, the chamber 16 may have an effective air delivering volume of between one-eighth to one-half the volume of the cylinder 18.

In order continuously to supply the control chamber 16 with the air under pressure provided in the reservoir 14 formed in the handle portion 12a of the stapler 10, a passageway 50 is provided in the housing 12. As shown in FIG. 2 of the drawings, the passageway 50 includes a pair of arcuate branches 50a and 50b formed in an enlarged cylindrical portion 12b of the housing 12 which is adapted to receive the valve assembly 28. Accordingly, the control chamber 16 is continuously supplied with compressed air at the full line pressure irrespective of the operated or released condition of the valve assembly 28.

In order to provide valve means for controlling the admission of air from the chamber 16 into the driving cylinder 18, the control piston arrangement 26 is provided. This arrangement includes a cylinder piston portion 52 which is slidably movable within the cylinder 16 and which is provided with a peripheral groove 53 within which is disposed a sealing gasket or ring 54 of resilient material. The valve element 24 is connected to the piston 52 by an integral depending portion 56 and comprises a circular plate 58 having an annular resilient gasket 60 secured thereto by a retaining plate 62 which is secured to the plates 58 by an upwardly extending and externally threaded portion 62a. The piston arrangement 26 is normally urged downwardly so that the resilient gasket 60 engages the valve seat defined by the flange 46, thereby to provide a tightly closed valve arrangement, by means of a coil spring 64 which engages the upper surface of the piston 52 and which is received within a shouldered recess 66 formed in the cap 48.

The control valve assembly 28 provides means for selectively admitting compressed air to and exhausting air from a portion 16a of the chamber 16, thereby to provide means for controlling the position of the control piston arrangement 26, and, accordingly, of the valve element 24. More specifically, the valve assembly 28 includes a valve body member 64 which is drive or press fitted within a cylindrical opening 66 drilled in the enlarged portion 12b of the housing 12. The valve body 64 is provided with a passageway 68 which is in communication with the air reservoir 14 through a portion of the passageway 50 and which terminates in a cylindrical bore 70 formed in the valve body 64. The upper end of the cylindrical bore 70 is closed by a plug 71 which is threadedly received within the upper portion of the bore 70 and which is provided with a resilient sealing gasket 73 encircling a lower portion thereof. The bore 70 also includes a shoulder 72 on which is positioned an annular resilient sleeve 74 having a passageway 76 formed therethrough. The sleeve 74 is retained within the bore 70 by an end portion 78 of the plug 71 having a centrally disposed aperture 80 and a transverse passageway 81 formed therein. The aligned openings 76 and 80 place the passageways 68 and 81 in communication with a valve chamber 82, and the chamber 82, in turn, is placed in fluid communication with a passageway 84 formed in the housing 12 by a passageway 86 having offset portions 86a and 86b. The passageway 84 terminates in a port 84a in the wall of the portion 16a of the chamber or cylinder 16 which is disposed between the lower wall of the cap 48 and the upper wall of the piston 52. Accordingly, when the control valve assembly 28 is in its normal position, the air under pressure in the reservoir 14 flows through the passageways 68 and 81, the openings 76 and 80, the valve chamber 82, and the passageways 84 and 86 to enter the portion 16a of the control chamber 16 through the port 84a.

Since, as described above, the portion of the chamber 16 disposed below the lower surface of the piston 52 is directly and continuously supplied with compressed air from the reservoir 14, and, since the portion 16a of the cylinder 16 disposed above the upper surface of the piston 52 is also supplied with compressed air of the same pressure from the reservoir 14 through the valve assembly 28, any tendency of the control piston arrangement 26 to be displaced by the compressed air is positively prevented by the balanced forces exerted by the compressed air on the opposite sides of the piston 52. The additional biasing force provided by the spring 64 and by the compressed air acting on the upper surface of the plate 58 urges the gasket 60 into sealing engagement with the valve seat defined by the flange 46 to close off communication between the chambers 16 and 18.

The conrtol valve assembly 28, when operated, vents the portion 16a of the cylinder 16 to the atmosphere so that the valve element 24 is displaced upwardly to permit the compressed air in the cylinder 16 and, ultimately, that in the reservoir 14 to flow into the operating cylinder 18, thereby to actuate the staple driving mechanism. To this end, the valve assembly 28 includes a manually actuated valve operating stem 88 having a finger piece 88a and an end portion 88b of a reduced diameter. The valve stem 88 is slidably mounted within a bore 90 in the valve body 64, the bore 90 being in communication with the valve chamber 82. The valve is constituted by a ball or spherical member 92 which is normally held in engagement with a resilient O-ring 94 seated on a shoulder 96 in the valve body 64 by the compressed air supplied from the reservoir 14 to the valve chamber 82 through the passageway 68.

When the valve assembly 28 is operated to actuate the stapler 10, the valve stem 88 is manually moved upwardly so that the portion 88b thereof engages the spherical member 92 to move it into engagement with the lower surface of the resilient sleeve 74, thereby to close the opening 76 therein to prevent a flow of compressed air from the reservoir 14 to the upper portion 16a of the control cylinder 16. In moving the spherical valve member 92 to the position shown in FIG. 5, a path is completed for venting the upper portion of the control chamber 16 to atmosphere. More specifically, moving the ball 92 out of engagement with the O-ring 94 places the bore 90 in communication with the valve chamber 82 so that the compressed air within the upper portion 16a of the control cylinder 16 flows outwardly to atmosphere through the passageways 84 and 86, the valve chamber 82, the bore 90, an inclined passageway 98 formed in the valve body 64, and a vent passageway 100 which is formed in the handle portion 12a of the casting or housing 12.

Figure 5:
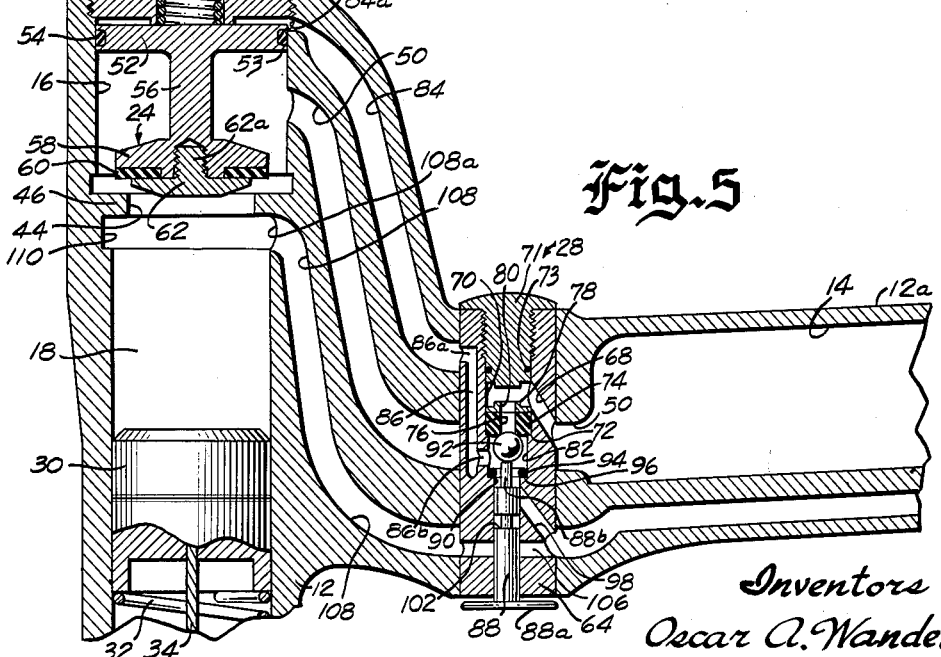
FIG. 5 is an enlarged fragmentary cross sectional view of the stapling apparatus illustrating the stapler in a staple driving position.

The interruption in the supply of compressed air to the upper portion 16a together with the venting of this portion of the cylinder 16 to atmosphere causes the operation of the piston arrangement 26 inasmuch as the force of the compressed air in the chamber 16 acting on the greater area of the lower surface of the piston portion 52 overcomes the resilient downwardly directed force of the spring 64 and the similarly directed force due to the compressed air in the cylinder 16 acting on the smaller area of the upper surface of the plate 58. These unbalanced forces move the piston arrangement 26 to the displaced position shown in FIG. 5. In moving to this position, the resilient gasket 60 is moved out of engagement with the valve seat defined by the flange 46 so that the large volume of compressed air in the control chamber 16 together with the compressed air provided in the reservoir 14 flow into the operating cylinder 18 without substantial turbulence or throttling and at substantially the full line pressure, thereby to advance the driving piston 30, as shown in FIG. 5, to drive a staple into a workpiece.

It is readily appreciated that, since the body of compressed air initially delivered to the driving chamber 18 is supplied by the chamber 16, the compressed air therein has attained full line pressure prior to its admission into the cylinder 18, and, since the opening 44 through which this air passes is substantially enlarged, there is no appreciable reduction in the air pressure passing from the chamber 16 into the chamber 18. Further, since the chamber 16 is in continuous communication with the reservoir 14 through passageways which are free of restricted orifices, such as are provided in conventional control valves, the reservoir 14 supplies the chambers 16 and 18 with compressed air at a pressure substantially the same as that provided by the air line 20 and in substantially unlimited quantities.

When the valve stem 88 is released, the air pressure within the reservoir 14 again forces the spherical valve member 92 into a seating engagement with the O-ring 94 to seal the communication between the upper portion 16a of the control chamber 16 and the atmosphere and to open the passageway extending between the compressed air reservoir 14 and this upper portion of the chamber 16. The return flow of compressed air into the upper portion of the cylinder 16 operates, together with the spring 64, to return the piston arrangement 26 to the position shown in FIGS. 1 and 4 in which the valve element 24 again closes the opening 44 between the cylinders 16 and 18, thereby to permit the spring 32 to return the driving piston 30 to its normal position in engagement with the flange 46.

The control valve 28 also provides means for selectively venting the driving cylinder 18 to facilitate the return of the piston 30 and the blade 34 by the spring 32. More specifically, the valve stem 88 includes an intermediate portion 102 of reduced diameter which, in the normal position of the valve assembly 28 (FIG. 1) is aligned with a transverse passageway 106 formed in the valve body 64. One end of the passageway 106 is in communication with the venting passageway 100 and the other end of the passageway 106 is in communication with a passageway 108 formed in the housing 12 which terminates in a port 108a opening into a peripherally extending groove 110 formed in the housing 12 immediately adjacent the flange 46. Accordingly, when the valve assembly 28 is in its normal position, the upper portion of the driving cylinder 18 is in communication with the atmosphere through the passageways 100, 106, and 108.

In order to close the venting passageway for the cylinder 18, when the stapler 10 is to be operated, thereby to prevent the discharge of the air supplied to the cylinder 18 to the atmossphere, the initial movement of the valve stem 88 to the position shown in FIG. 4 of the drawings moves the reduced diameter portion 102 of the stem 88 out of registration with the passageway 106 so that the larger diameter portion of the actuating stem 88 effectively seals off communication between the passageways 100 and 108 prior to the time at which the spherical valve member 92 is lifted to place the passageway 100 in communication with the upper portion 16a of the control cylinder 16. Continuing upwardly directed movement of the valve stem 88 operates the stapler 10, as described above, by admitting compressed air to the now sealed chamber 18.

When the valve stem 88 is released, the compressed air moves the engaged spherical valve member 92 and stem 88 so that the ball 92 seats on the ring 94 to close off communication between the passageways 84 and 100 and to admit compressed air to the portion 16a of the cylinder 16 for operating the piston 52 and valve element 24 to close the opening 44, thereby to prevent a further flow of compressed air into the cylinder 18. Continuing downward movement of the stem 88 then moves the reduced diameter portion 102 into registration with the spaced portions of the passageway 106 to vent the compressed air within the driving cylinder 18 to the atmosphere through the passageways 108, 106, and 100 so that the piston 30 and the blade 34 can be returned to their normal position adjacent the flange 46 by the spring 32.

In view of the detailed description of the stapler 10 set forth above, it is believed that a typical operation of this device will be readily understood. In its normal condition, compressed air is supplied to the cylinder 16 through the passageway 50 from the reservoir 14, and the valve assembly 28 provides compressed air to the upper portion 16a of the control chamber 16 through the passageway 84. The provision of compressed air to both sides of the piston 52 maintains the valve element 24 in engagement with the flange 46, thereby closing the opening 44 to prevent a flow of the compressed air from the control chamber 16 to the driving chamber 18. Further, the reduced diameter portion 102 of the valve stem 88 is aligned with the spaced portions of the passageway 106 to vent the driving cylinder 18 to the atmosphere. When it is desired to operate the stapler 10, the finger piece 88a of the valve stem 88 is engaged, and the valve stem 88 is first moved to the position shown in FIG. 4 in which the enlarged diameter portion of the valve stem 88 closes communication between the two portions of the passageway 106, thereby to close the passageway 108 and to seal the cylinder 18.

Continuing movement of the valve stem 88 displaces the spherical valve member 92 from the valve seat afforded by the O-ring 94 so that the compressed air within the upper portion 16a of the control chamber 16 is vented to the atmosphere to produce a pressure differential between the two sides of the piston 52, thereby resulting in the piston being moved vertically upward to the position shown in FIG. 5 of the drawings. At this time, the compressed air within the control chamber 16 and that provided in the reservoir 14 flows without substantial turbulence and without a substantial decrease in pressure into the upper portion of the driving chamber 18. The upwardly directed movement of the valve stem 88 has also moved the ball 92 into a seating engagement with the resilient sleeve 74, thereby closing the opening 76 to prevent a flow of compressed air through the valve chamber 82 into the upper portion of the control cylinder 16.

The admission of air to the cylinder 18, as described above, forces the piston 30 in a downward direction so that the driving blade 34 engages the staple provided by the magazine 38 and drives the engaged staple through the nosepiece 36 into a workpiece. When the valve assembly 28 is released by removing pressure from the finger piece 88a, the compressed air in the bore 70 unseats the shperical member 92 from engagement with the sleeve 74 to permit compressed air to flow to the upper portion 16a of the control cylinder 16 through the passageway 84, thereby moving the piston arrangement 26 downwardly to seat the gasket 60 on the flange 46 and, accordingly, to interrupt the flow of compressed air from the chamber 16 and the reservoir 14 into the driving cylinder 18. In addition to opening the passageway from the air reservoir 14 to the upper portion of the cylinder 16, downward movement of the valve stem 88 permits the spherical member 92 to seat on the O-ring 94, thereby interrupting the venting connection to the upper portion 16a of the cylinder 16. Continuing downward movement of the valve stem 88 moves the reduced portion 102 into registration with the spaced portions of the passageway 106 to vent the driving cylinder 18 to atmosphere. This permits the compression spring 32 to return the driving piston 30 and the driving blade 34 to their normal position, as shown in FIG. 1.

Referring now more specifically to FIGS. 6–8 of the drawings, therein is shown a pneumatic tacker, indicated generally as 120, which embodies the present invention and which includes a housing or casting 122 having a hollow handle defining a reservoir 124 and a head portion 126 defining an operating chamber 128 which is aligned with a control chamber 130. Communication between the control chamber 130 and the operating chamber 128 is normally sealed off by control valve assembly indicated generally as 132. When the valve assembly 132 is operated to place the chambers 128 and 130 in communication, a drive piston 134, which is slidably mounted in the chamber 128, is moved downwardly so that a driver blade 136 connected thereto is advanced through a drive track 138 formed in the housing 122 to engage and drive a staple supplied by a magazine assembly 140. When the control valve assembly 132 is released to close off communication between the control chamber 130 and the operating chamber 128, a piston return spring 142 restores the piston 134 and the driver blade 136 to the normal position illustrated in the drawings.

Referring now more specifically to the control valve assembly 132, this assembly includes a sleeve 144 having an integrally formed flange 146 which is slidably disposed in the control chamber 130 so that one surface of the flange 146 engages a shoulder 130a formed on the housing 122. The flange 146 forms a valve seat providing an opening 148 of substantially the same diameter as the diameters of the control chamber 130 and the operating chamber 128. An O-ring 150 is disposed within a groove defined by the flange 146 to prevent the loss of air through the interface between the walls of the chambers 128 and 130 and the sleeve 144. A slot or opening 152 places the interior of the control chamber 130 or sleeve 144 in continuous communication with the reservoir 124 formed in the handle of the housing 122.

The control valve assembly 132 includes a control piston element 154 having an integrally formed depending portion 156 which defines a cylindrical opening 158 and which terminates at its lower end in a somewhat circular enlarged portion 159. A resilient main valve element 160 is secured to the enlarged portion 159 by nut 162 and a washer 164. In the normal or released position of the stapler 120, the resilient valve element 160 is urged into engagement with the valve seat defined by the flange 146 to close off communication through the passageway 148 between the control chamber 130 and the operating chamber 128.

To provide means for slidably supporting the piston element 154 on the housing 122, a closure cap 166 is provided which closes the open upper end of the control chamber 130. The closure cap 166 includes an integrally formed depending portion 168 which is slidably received within the opening 158 formed in the depending portion 156 of the control piston element 154. Thus, when the closure cap 166 is removed, the piston element 134, the sleeve 144, the piston element 154, the driver blade 136, and the piston return spring 142 can be removed from the open upper end of the control chamber 130. Accordingly, the necessity of providing a threaded connection between the magazine 140 and the lower end of the head portion 126 of the housing 122 is obviated with an attendant decrease in the cost of forming and assembling the pneumatic stapler 120.

As indicated above, the main valve element 160 is normally held in engagement with the valve seat defined by the flange 146 to close off communication between the control chamber 130 and the operating chamber 128. Alternatively, the chambers 130 and 128 are placed in communication so that compressed air actuates the piston 134 by shifting the main valve element 160 out of engagement with the flange 146. This shifting movement of the main valve element 160 is accomplished by selectively applying compressed air to or exhausting compressed air from the upper portion of the control chamber 130 that is disposed above the upper surface of the control piston 154. More specifically, in the normal or released position of the tacker or stapler 120, compressed air is supplied from the reservoir 124 and the control chamber 130 through a plurality of peripherally spaced openings 170 in the hollow depending portion 156, an opening 172 formed in the depending element 168, and a pair of aligned openings 174 and 176 formed in a resilient valve seat 178 and in a retaining element 180, respectively. The externally threaded retaining element 180 secures the resilient valve seat 178 within the opening 172. The compressed air supplied through the openings 174 and 176 enters a valve chamber 182 and normally holds a ball valve element 184, which is freely disposed within the chamber 182, in engagement with an O-ring 186. In this position of the ball valve 184, the compressed air in the chamber 182 flows into the upper end of the control chamber 130 through a portion of the opening 158 and a plurality of passageways 188 which extends radially outward through the depending portion 168.

Accordingly, in the normal or released position of the tacker 120, the compressed air in the chamber 130 acting on the upper surface of the piston element 154 and the upper surface of the enlarged portion 159 and a compression spring 190, which is interposed between the lower surface of the retaining element 180 and the lower end of the opening 158, provide a downwardly directed force. This force exceeds the upwardly directed force due to the compressed air acting on the lower surface of the piston 154 and, thus, the resilient valve element 160 is held in sealing engagement with the flange 146 to close off communication through the passageway or opening 148.

When the tacker 120 is to be operated, a finger piece 192 is pivoted at a counterclockwise direction (FIG. 6) to move downwardly a first section 194 of an operating rod or shaft which is slidably mounted within an opening in a projecting portion 126a of the head portion 126. In moving downwardly, a notched or recessed portion 194a of the rod moves out of alignment with a passageway 196 in the housing 126 which connects the upper end of the operating chamber 128 with the atmosphere. Thus, this movement of the operating rod 194 closes off the exhaust passageway for the upper end of the chamber 128. The upper end of the rod 194 is provided with an opening 198 in which is disposed the lower end of a second operating rod 200. The lower end of the rod 200 has a slot 202 in which a pin 204 carried on the upper end of the rod 194 is slidably received to provide a lost motion connection between the rod sections 194 and 200. A cover 205 carried on the head portion 126 includes an opening 207 through which the rod 200 extends.

Thus when the rod 194 has been moved downwardly a sufficient distance to close off the exhaust passageway 196, the pin 204 reaches the lower end of the slot 202 and downward movement of the rod 200 is initiated. In moving downwardly, a free end 200a of the rod 200 engages the ball valve 184 and moves it out of engagement with the O-ring 186 and into engagement with the resilient valve element 178. In moving into engagement with the valve element 178, the aligned openings 174 and 176 are closed to prevent the supply of compressed air to the upper end of the control chamber 130. In moving out of engagement with the O-ring 186, the ball valve 184 opens an exhaust passageway for the upper end of the control chamber 130. This passageway extends through a portion of the opening 158, the passageways 188, and an opening 206 in the closure cap 166 through which the end 200a of the rod 200 extends. Thus, the compressed air in the upper portion of the chamber 130 is exhausted.

Exhausting the compressed air from the upper end of the control chamber 130 produces a pressure differential across the piston element 154 so that this element moves upwardly to lift the main valve element 160 out of engagement with the valve seat formed by the flange 146. This places the control chamber 130 and the operating chamber 128 in communication through the opening 148, which opening is of substantially the same effective area as the cross sectional area of these two chambers. The chamber 130 has an effective volume of from one-eighth to one-half that of the chamber 128 to provide a reservoir of compressed air at full line pressure for use in driving the piston 134. Accordingly, a large volume of air at full line pressure is instantaneously supplied from the reservoir 124 and the control chamber 130 into the operating chamber 128 so that the piston 134 moves downwardly against the action of the spring 142 to advance the driver blade 136 through the drive track 138, thereby driving a staple supplied by the magazine 140. A plurality of openings 208 at the lower end of the head portion 126 provide means for exhausting the air entrapped in the lower end of the operating chamber or cylinder 128.

When the trigger element 192 is released, suitable biasing means (not shown) move the operating rods or links 194 and 200 to the positions illustrated in FIG. 8. In moving to this position, the notched portion 194a on the rod 194 is moved into alignment with the passageway 196 so that an exhaust for the upper end of the operating cylinder 128 is provided. When the free end 200a of the operating rod 200 moves upwardly, compressed air is supplied through the openings 174, 176 to move the ball valve 184 out of engagement with the valve element 178 and into engagement with the O-ring 186. The engagement of the O-ring 186 by the ball valve 184 closes off the above described exhaust system for the upper portion of the control chamber 130, and the movement of the ball valve 184 out of engagement with the valve element 178 opens up the above described fluid passageways to supply air under pressure to the upper portion of the chamber 130. This compressed air acts on the upper surface of the piston element 154 to provide a force which, coupled with the force supplied by the compression of the spring 190, restores the control piston 154 to the position illustrated in FIGS. 7 and 8 in which the valve element 160 engages the flange 146 on the sleeve 144 to close off communication between the control chamber 130 and the operating chamber 128. The spring 142 then restores the piston 134 and the driver blade 136 to their normal positions.

In view of the detailed description set forth above, it will be readily appreciated that the pneumatically operated stapler embodying the present invention is capable of obtaining greatly increased penetration of pneumatically driven fasteners or staples by the provision of a large body of compressed air immediately adjacent the operating cylinder of the stapler or tacker which passes at full line pressure and without substantial turbulence or throttling directly into the driving chamber. Further, the construction is simple to operate, does not require the provision of complicated and costly controlling mechanisms, and is readily maintained by relatively inexperienced personnel. In one tacker constructed in accordance with the present invention, one inch staples have been driven into very hard wood, such as oak, by using air pressures of the order of sixty pounds per square inch, and, at these and even higher pressures, the trigger actuated valve assembly requires the application of less than five pounds of pressure for operation.

While the invention has been described with reference to a particular embodiment thereof, it will be understood that those skilled in the art may make many changes and modifications without departing from the principles of the invention. Therefore, it is intended in the appended claims to cover all changes and modifications which fall within the true spirit and scope of the principles of this invention.

What is claimed as new and desired to be secured by Letters Patent of the United States is:

1. A fastener driving apparatus comprising a housing defining a pair of reservoirs and an operating chamber, fastener driving means movable within said chamber, one of said reservoirs being supplied with air under pressure from a source thereof, the other of said reservoirs being disposed closely adjacent said chamber and in continuous fluid communication with said one reservoir, said other reservoir having a volume of the order of from one-eighth to one-half of the volume of said chamber, valve means controlling communication between said other reservoir and said chamber, and control means for operating said valve means to admit air from said other reservoir to said chamber thereby to operate said fastener driving means with compressed air of substantially the same pressure as the air supplied from said source.

2. Apparatus for driving fasteners comprising a housing having a pair of spaced and aligned chambers, said chambers being defined by a single element having a continuous vertically extending and cylindrical wall surface with an annular inwardly projecting and integrally formed portion defining a valve seat, a fastener driving piston movably mounted in one of said chambers, a control piston movably mounted in the other of said chambers, said control piston including structure defining a valve member for engaging said valve seat, said other chamber being continuously supplied with air under pressure and said control piston normally being positioned so that said valve member eagages said valve seat to close off communication between said chambers, and control means including pneumatic means for operating said control piston to move said valve member out of engagement with said valve seat whereby the air under pressure flows into said one chamber from said other chamber.

3. Apparatus for driving fasteners comprising a housing defining two spaced chambers connected by a passageway, means movably mounted in one of said chambers for actuating a fastener driving means, a control piston in said other chamber, a valve element controlled by said piston, means continuously supplying air under pressure to one side of said piston, means supplying air under pressure to the other side of said piston to actuate the valve element to close communication through said passageway, first valve means for exhausting the air under pressure from said other side of said piston to move said piston to actuate said valve element whereby the air under pressure on said one side of said piston enters said one chamber, an exhaust passageway in communication with the upper end of said one chamber, second valve means for closing said exhaust passageway, and manually actuated means connected to said first and second valve means for operating said first and second valve means.

4. Apparatus for driving fasteners comprising a housing defining two spaced chambers connected by a passageway, means movably mounted in one of said chambers for actuating fastener driving means, a control piston movably mounted in the other of said chambers for controlling the admission of air under pressure into said one chamber through said passageway, said control piston including a transversely extending portion in sliding engagement with the walls of said other chamber and movable axially relative to said chamber, said housing including means defining a first fluid conveying means terminating in a first port in said other chamber positioned to one side of and in communication with said one side of the transversely extending portion of said piston, said housing also including means defining a second fluid conveying means terminated in a second port in said other chamber located at the other side of and in communication with said other side of said transversely extending portion of said piston, and valve means controlling the flow of air through one of said fluid conveying means.

5. The apparatus set forth in claim 4 in which a source of air under pressure is connected to said second fluid conveying means to supply air under pressure to said other chamber and in which said valve means normally connects said first fluid conveying means with said source of air under pressure whereby the control piston is held in a position in which a flow of air under pressure through said passageway is prevented.

6. The apparatus set forth in claim 4 in which the valve means is operative to a position in which said second fluid conveying means is disconnected from said source of air under pressure and is connected to the atmosphere so that said control piston is moved to place said spaced chambers in communication.

7. A fastener driving apparatus comprising a housing defining a pair of spaced chambers connected by an opening, fastener driving means slidably disposed in one of said chambers, valve means normally closing said opening and including a piston movably mounted in the other of said chambers, means for continuously supplying compressed air to said other chamber at one side of said piston, and valve means normally supplying compressed air to said other chamber at the other side of said piston and operable to concurrently interrupt the supply of compressed air to said other side of said piston and exhaust said other chamber at said other side of said piston so that said piston moves said valve means to permit the compressed air continuously supplied to said one side of said piston to flow from said other chamber through said opening into said one chamber.

8. A fastener driving apparatus comprising a housing defining a cylindrical cavity having a valve seat defining flange providing first and second aligned chambers, fastener driving means movably mounted in said first chamber, a valve element disposed in said second chamber and engaging said flange to close off communication between said first and second chambers, a piston connected to said valve element and slidably disposed in said second chamber, means for continuously supplying compressed air to said second chamber at one side of said piston, and valve means for concurrently controlling the selective application of compressed air to and the exhaustion of said second chamber at the other side of said piston, said valve means normally supplying compressed air to said second chamber and operable to concurrently interrupt the supply of compressed air to and exhaust compressed air from said second chamber for moving said piston and valve element away from said flange whereby compressed air flows from said second chamber into said first chamber to operate said fastener driving means.

9. An apparatus for driving fasteners comprising a housing defining a pair of axially spaced and concentric cylinders, an annular flange projecting into one of said cylinders to define an inlet opening for said one cylinder, fastener driving means including a piston slidably mounted in said one cylinder, means normally biasing said piston into engagement with said flange, valve means normally engaging said flange to close said inlet opening, means including a control piston slidably mounted in said other cylinder for moving said valve means into and out of engagement with flange to selectively open and close said inlet opening, and valve means for selectively supplying air under pressure to said other cylinder to actuate said control piston.

10. Apparatus for driving fasteners comprising a housing defining two spaced chambers connected by a passageway, means movably mounted in one of said chambers for actuating fastener driving means, a control piston movably mounted in the other of said chambers for controlling the admission of air under pressure into said one chamber through said passageway, said control piston including a transversely extending portion in sliding engagement with the walls of said other chamber and movable axially relative to said chamber, means defining a first fluid conveying means communicating with said other chamber at a position located to one side of the transversely extending portion of said piston and means defining a second fluid conveying means in communication with said other chamber at a position located at the other end of said transversely extending portion of said piston, and valve means for controling the flow of air through one of said fluid conveying means to shift said control piston to selectively admit air from said other chamber to said one chamber.

11. The apparatus set forth in claim 10 in which the housing includes a removable closure cap for closing one end of said other chamber and in which a compression spring is interposed between said closure cap and said control piston for biasing said control piston toward a position in which said passageway is closed.

12. The apparatus set forth in claim 10 in which the housing includes a removable closure cap for closing one end of said other chamber and in which said valve means is carried on said closure cap.

13. An apparatus for driving fasteners comprising a housing defining a pair of axially spaced chambers, structure removably mounted in one of said chambers and having an apertured lower wall defining an inlet to the other of said chambers, fastener driving means including a piston slidably mounted in said other chamber, valve means normally engaging said lower wall to close said inlet, means for continuously supplying compressed air to said one chamber, a slidably mounted control piston disposed in said one chamber for moving said valve means to selectively admit compressed air to said other chamber from said one chamber, an exhaust means communicating with said other chamber at a point below said lower wall and including an opening in the wall of the chamber, and manually actuated control means for selectively connecting one surface of said control piston to the atmosphere or compressed air and for selectively opening and closing said exhaust means.

14. The apparatus set forth in claim 13 in which said housing includes a closure cap closing one end of said one chamber and in which said closure cap includes projecting means for slidably supporting said control piston.

15. The apparatus set forth in claim 14 in which said control means includes valve means carried on said projecting means for selectively exhausting compressed air from said one chamber.

16. In a driving machine, a housing providing a pressure fluid reservoir of substantial volume, a cylinder having its end exposed to said reservoir and carrying a driving piston therein, means normally urging said driving piston toward said end, valve means normally closing said end from said reservoir and being normally closingly subjected to pressure fluid from the reservoir through a substantially unrestricted passage, and means for selectively closing said passage from the reservoir and bleeding the same so that pressure fluid in the reservoir will open said valve means and expose the piston in said cylinder to the full effect of pressure fluid in the reservoir.

17. In a driving machine including a pneumatic driving device, a casing structure including a head portion and a portion extending therefrom with a pressure fluid reservoir of substantial volume in the head portion, a cylinder open at one end to said reservoir and having a piston therein normally biased toward the open end but operable in a driving stroke away from said open end by the fluid pressure within said reservoir, a closure valve member normally closing said open end of the cylinder, and pneumatic means for controlling said closure valve including both a substantially unrestricted passage from said extending portion into said head portion for conveying fluid pressure from the reservoir to said head portion for biasing said closure valve member into closing position and a control valve operable externally of said head portion and projecting portion and movable into closing relation to said passage to relieve said closure valve from the closingly biasing effect of the pressure fluid to permit said closure valve to open and expose the cylinder and the piston therein to pressure fluid.

18. A pneumatically operated fastener driving device comprising a housing having a head portion defining a first chamber and a cylinder having an open end in communication with said first chamber, said housing also having a hollow handle portion extending rearwardly from said head portion and providing a second chamber in continuous and unrestricted communication with said first chamber, said first and second chambers providing a reservoir of compressed air for operating said fastener driving device; a piston slidably mounted in said cylinder; means for biasing said piston toward the open end of said cylinder; pneumatic control valve means including a piston portion movably mounted in said head portion and a valve portion movable into and out of closing relation with the open end of said cylinder, a lower surface of said piston portion being exposed to the compressed air in said reservoir which biases said valve portion away from said closing relation with said open end of said cylinder; an unrestricted passageway formed in said housing and extending rearwardly from an upper portion of said head portion to communication with said reservoir at a position adjacent the juncture of said head portion and said handle portion, said passageway normally supplying compressed air from said reservoir to said upper portion of said head portion to act on the upper surface of said piston portion to bias said valve portion into closing relation with said open end; resilient means positioned in said upper portion of said head portion and acting on said pneumatic control valve means to bias said valve portion into closing relation with said open end; and a control valve assembly mounted on said housing adjacent said juncture of the head and handle portions of said housing, said control valve assembly including a movable valve element and a valve operating element extending out of said housing and operable to control the movement of said valve element, said control valve assembly also including an exhaust passage, said movable valve element being movable by said valve operating element to a position closing off communication between said passageway and said reservoir and placing said passageway in communication with said exhaust passage so that compressed air in said reservoir acts on said piston portion to move said valve portion out of closing relation with said open end, said movable element also being movable to a position placing said passageway in communication with said reservoir and out of communication with said exhaust passage so that said resilient means and the compressed air in said upper portion of said head portion act on said pneumatic control valve means to move said valve portion into said closing relation with said open end.

19. A fluid operated fastener driving tool comprising a reservoir continuously provided with a fluid pressure supply, cylinder means exposed to said fluid, fastener driving means slidably mounted in said cylinder means, a valve seat on said cylinder faced toward the fluid pressure supply, a valve element directly exposed to said fluid pressure and held in pressured engagement on the seat thereby, fluid pressure controlled means operatively coupled to the valve element to lift said element off of the seat, and a control means alternately directing a flow of fluid to said fluid pressure controlled means from said fluid supply and exhausting the fluid from said fluid pressure controlled means.

20. In a driving machine, a housing providing a chamber and a reservoir continuously supplied with a pressure fluid, a cylinder having its end exposed to the reservoir and carrying a driving piston therein, valve means for normally closing the end of the cylinder, piston means slidably mounted in the chamber and connected to said valve means, a substantialy unrestricted passage communicating with said chamber at one side of said piston means, and a control valve mounted on said housing in communication with said unrestricted passage, said control valve being operable to one position to connect said passage to the atmosphere and to a second position to connect said passage to the reservoir so that said piston means selectively moves said valve means out of engagement with the end of the cylinder to expose the driving piston to the full effect of the pressure fluid in the reservoir.

21. In a driving machine including a pneumatic driving device, a casing structure including a head portion and a portion extending therefrom with a pressure fluid reservoir of substantial volume in the head portion; a cylinder open at one end to said reservoir and having a piston therein normally biased toward the open end but operable in a driving stroke away from said open end by the fluid pressure within the reservoir; closure valve means normally closing said open end of the cylinder; and pneumatic means for controlling said closure valve, said pneumatic means including pressure fluid operated means for moving said closure valve means, an unrestricted passage in said head portion communicating with one surface of said pressure fluid operated means, and a control valve operable externally of said head portion and projecting portion and movable between a first position connecting the unrestricted passage to the atmosphere and a second position connecting said passage to the pressure fluid in the reservoir so that said pressure fluid operated means moves the closure valve means to open and close end of the cylinder.

22. A pneumatically operated fastener driving device comprising a housing having a head portion defining a first chamber and a cylinder having an open end in communication with said first chamber, said housing also having a hollow handle portion extending rearwardly from said head portion and providing a second chamber in continuous and unrestricted communication with said first chamber, said first and second chambers providing a reservoir of compressed air for operating said fastener driving device; a piston slidably mounted in said cylinder, said piston being normally biased toward the open end of said cylinder; pneumatic control valve means movably mounted in said head portion and including a valve portion movable into and out of closing relation with the open end of said cylinder, a lower surface of said control valve means being exposed to the compressed air in said reservoir which biases said valve portion away from said closing relation with said open end of said cylinder; an unrestricted passageway formed in said housing and extending rearwardly from an upper portion of said head portion to communication with said reservoir at a position adjacent the juncture of said head portion and said handle portion, said first passageway normally supplying compressed air from said reservoir to said upper portion of said head portion to act on the upper surface of said control valve means to bias said valve portion into closing relation with said open end; and a control valve assembly mounted on said housing adjacent said juncture of the head and handle portions of said housing, said control valve assembly including a movable valve element and a valve operating element extending out of said housing and operable to control the movement of said valve element, said control valve assembly also including an exhaust passage, said movable valve element being movable by said valve operating element to a position closing off communication between said passageway and said reservoir and placing said passageway in communication with said exhaust passage so that compressed air in said reservoir acts on said control valve means to move said valve portion out of closing relation with said open end, said movable element also being movable to a position placing said passageway in communication with said reservoir and out of communication with said exhaust passage so that the compressed air in said upper portion of said head portion acts on said control valve means to move said valve portion into said closing relation with said open end.

23. In a driving machine, a housing including structure defining a generally cylindrical cavity, flange means formed integral with said structure and extending into said cavity to separate said cavity into a lower cylinder and an upper chamber with an upper cylindrical portion, said flange means defining an inlet opening for said cylinder and providing a valve seat surrounding said inlet opening, fastener driving means including a drive piston slidably mounted in said cylinder and normally biased toward said flange means, valve means normally closing the end of the cylinder, piston means slidably mounted in the upper cylindrical portion of the chamber and connected to said valve means, means for continuously supplying pressure fluid to said chamber at one side of said piston means to normally bias said valve means against said valve seat, a substantially unrestricted passage communicating with the upper cylindrical portion of said chamber at the other side of said piston means, and a control valve mounted on said housing in communication with said unrestricted passage, said control valve being operable to one position to connect said passage to the atmosphere and to a second position to connect said passage to the reservoir so that said piston means moves said valve means in and out of engagement with the valve seat to open and close the inlet opening whereby said drive piston is selectively operated by the pressure fluid in the chamber.

24. An apparatus for driving fasteners comprising a housing including structures defining a cylinder, an inwardly projecting portion forming a cylinder inlet, and a reservoir disposed above and in communication with the inlet, said reservoir normally being supplied with a pressure fluid; fastener driving means slidably mounted in the cylinder; main valve means disposed in said reservoir and including a slidably mounted piston portion, said main valve means normally closing said cylinder inlet; exhaust means including fluid conveying means communicating with said cylinder through a wall of said cylinder below said inwardly projecting portion; and control means including a manually operable element for selectively connecting one surface of said piston means to the pressure fluid and the atmosphere and for selectively opening and closing a connection between said fluid conveying means and the atmosphere.

25. The apparatus set forth in claim 24 in which the lower surface of said piston means is continuously exposed to the pressure fluid in the reservoir and in which said housing includes a passageway communicating with the upper surface of the piston means and controlled by said control means for applying the pressure fluid or atmospheric pressure to the upper surface of the piston means.

26. The fastener driving apparatus set forth in claim 24 including spring means interposed between the housing and the piston means for biasing said main valve means into engagement with the inwardly projecting portion to close the cylinder inlet.

27. A fastener driving apparatus comprising a housing having a head portion and a rearwardly extending and hollow handle portion, said head portion including structures providing a cylinder, an inwardly projecting valve seat at the upper end of the cylinder providing a cylinder inlet, and a chamber in communication with the hollow handle portion to provide a pressure fluid reservoir; fastener driving means including a piston slidably mounted in said cylinder and normally biased toward said valve seat; main valve means engaging said valve seat to prevent communication between the reservoir and the cylinder; piston means disposed in said chamber and connected to the main valve means for moving the main valve means into and out of engagement with the valve seat; first fluid conveying means in said head portion in communication with one surface of said piston means; a cylinder exhaust system including a second fluid conveying means communicating with the cylinder below said valve seat and extending rearwardly in the head portion from the cylinder; and manually actuated valve means for selectively connecting the second fluid conveying means to the atmosphere and for selectively connecting the first fluid conveying means to the atmosphere and the reservoir.

28. The fastener driving apparatus set forth in claim 27 in which said handle portion includes an exhaust passageway extending rearwardly from the head portion and adapted to be connected to both of the first and second fluid conveying means.

29. A fastener driving apparatus comprising a housing including structure providing a cylinder having an open end and a pressure fluid reservoir in communication with the cylinder through the open end, main valve means normally closing the open end of the cylinder, control means for producing relative movement between said main valve means and said cylinder to move said main valve means into and out of a position closing the open end of the cylinder, an exhaust system including fluid conveying means communicating with said cylinder adjacent the open end thereof, and manually actuated valve means for selectively connecting said passageway to the atmosphere independent of the position of the main valve means.

References Cited in the file of this patent

UNITED STATES PATENTS

| | | |
|---|---|---|
| 1,264,318 | McGrath | Apr. 30, 1918 |
| 2,671,214 | Juilfs | Mar. 9, 1954 |
| 2,677,933 | Hopkinson | May 11, 1954 |
| 2,687,522 | Juilfs | Aug. 31, 1954 |
| 2,713,165 | Campbell et al. | June 19, 1955 |
| 2,854,953 | Osborne | Oct. 7, 1958 |